(12) United States Patent
Sheret

(10) Patent No.: US 11,105,914 B2
(45) Date of Patent: Aug. 31, 2021

(54) MONOPULSE RADAR APPARATUS

(71) Applicant: MBDA UK LIMITED, Stevenage (GB)

(72) Inventor: Tamara Louise Sheret, Stevenage (GB)

(73) Assignee: MBDA UK LIMITED, Stevenage (GB)

( * ) Notice: Subject to any disclaimer, the term of this patent is extended or adjusted under 35 U.S.C. 154(b) by 236 days.

(21) Appl. No.: 15/562,091

(22) PCT Filed: Mar. 31, 2016

(86) PCT No.: PCT/GB2016/050901
§ 371 (c)(1),
(2) Date: Sep. 27, 2017

(87) PCT Pub. No.: WO2016/156847
PCT Pub. Date: Oct. 6, 2016

(65) Prior Publication Data
US 2018/0074183 A1 Mar. 15, 2018

(30) Foreign Application Priority Data

Mar. 31, 2015 (EP) ..................................... 15275107
Mar. 31, 2015 (GB) ..................................... 1505562

(51) Int. Cl.
*G01S 13/44* (2006.01)
*G01S 7/285* (2006.01)
(Continued)

(52) U.S. Cl.
CPC .......... *G01S 13/4472* (2013.01); *G01S 7/285* (2013.01); *G01S 7/4021* (2013.01); *G01S 13/44* (2013.01);
(Continued)

(58) Field of Classification Search
CPC ...... G01S 13/4472; G01S 13/88; G01S 7/285; G01S 13/44; G01S 7/4021; G01S 13/4463; G01S 13/883
(Continued)

(56) References Cited

U.S. PATENT DOCUMENTS 3,239,836 A 3/1966 Chub et al.
3,277,467 A 10/1966 Barney
(Continued)

FOREIGN PATENT DOCUMENTS

EP 1788407 A1 5/2007
WO WO 2014/057234 A1 4/2014

OTHER PUBLICATIONS

International Search Report dated Jun. 2, 2016 issued in PCT/GB2016/050901.
(Continued)

*Primary Examiner* — Bo Fan
(74) *Attorney, Agent, or Firm* — Scully, Scott, Murphy & Presser, PC

(57) ABSTRACT

Monopulse radar apparatus is disclosed. The apparatus comprises a digital processor and an antenna having a plurality of receive channels through which signals received by the antenna are passed to the processor. Each receive channel includes an analogue to digital converter, and the processor is arranged to calculate sum and difference signals from the signals received through each receive channel. The processor is also arranged such that, in the event that a malfunction is detected in one of the plurality of receive channels, compensated sum and difference signals are calculated by the processor using the signals from the remaining, functioning receive channels.

9 Claims, 6 Drawing Sheets

(51) Int. Cl.
*G01S 7/40* (2006.01)
*G01S 13/88* (2006.01)

(52) U.S. Cl.
CPC .......... *G01S 13/4463* (2013.01); *G01S 13/88* (2013.01); *G01S 13/883* (2013.01)

(58) Field of Classification Search
USPC ........................................ 342/372, 149, 427
See application file for complete search history.

(56) References Cited

U.S. PATENT DOCUMENTS

| | | | |
|---|---|---|---|
| 3,560,974 A | 2/1971 | Lecourtier et al. | |
| 6,456,238 B1* | 9/2002 | Posey | G01S 13/44 342/149 |
| 6,819,285 B1* | 11/2004 | Stockman | G01S 7/4021 342/123 |
| 7,702,295 B1* | 4/2010 | Nicholls | H04B 1/525 455/78 |
| 2002/0135517 A1* | 9/2002 | Yu | H01Q 25/02 342/427 |
| 2005/0275585 A1 | 12/2005 | Shima et al. | |
| 2011/0309966 A1* | 12/2011 | Descharles | G01S 13/4463 342/45 |
| 2012/0133548 A1* | 5/2012 | Schneider | G01S 7/4026 342/149 |
| 2012/0169540 A1* | 7/2012 | Jones | H01Q 3/267 342/372 |
| 2015/0061921 A1* | 3/2015 | Ding | G01S 13/003 342/140 |

OTHER PUBLICATIONS

Extended European Search Report dated Sep. 18, 2015 issued in EP 15275107.9.
GB Search Report dated May 5, 2015 issued in GB 15055627.
Keizer, Will P. M. N., "Element Failure Correction for a Large Monopulse Phased Array Antenna With Active Amplitude Weighting", IEEE Transactions on Antennas and Propagation (Aug. 2007), vol. 55, No. 8, pp. 2211-2218.
Peters, Timothy J., "A Conjugate Gradient-Based Algorithm to Minimize the Sidelobe Level of Planar Arrays with Element Failures", IEEE Transactions on Antennas and Propagation (Oct. 1991), vol. 39, No. 10, pp. 1497-1504.
International Preliminary Report on Patentability dated Oct. 12, 2017 issued in PCT/GB2016/050901.
Office Action dated Feb. 18, 2020 received from the European Patent Office in related application 16 715 059.8.

* cited by examiner

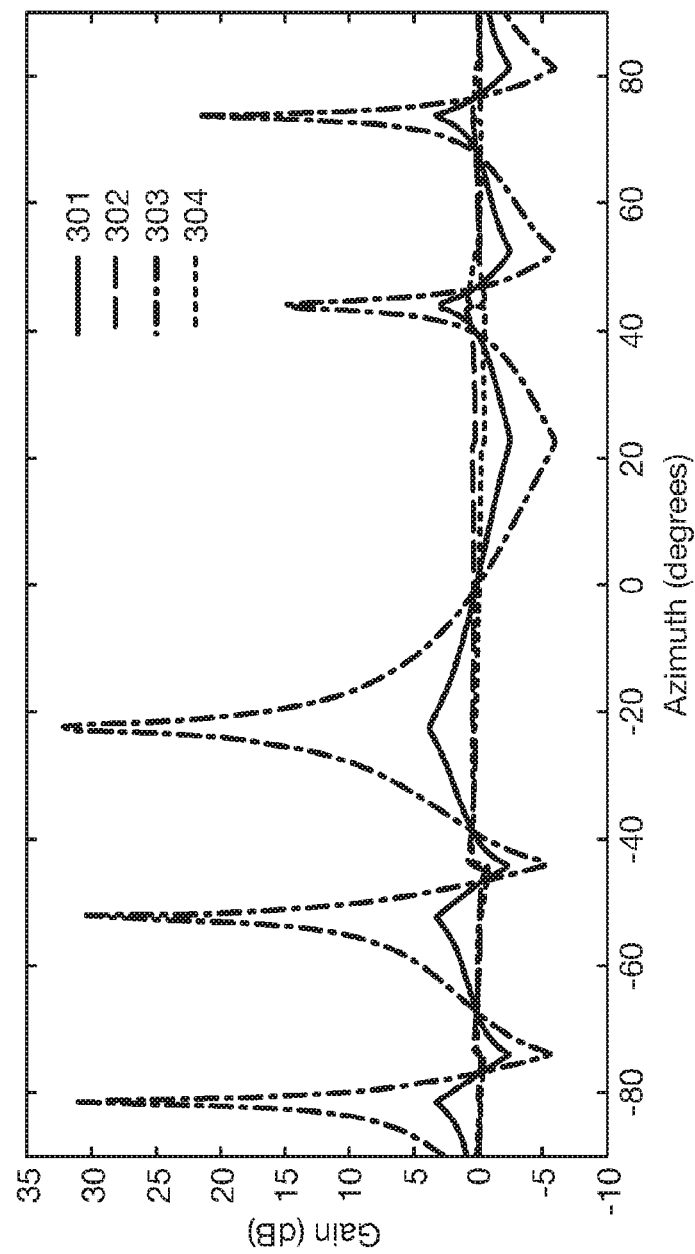

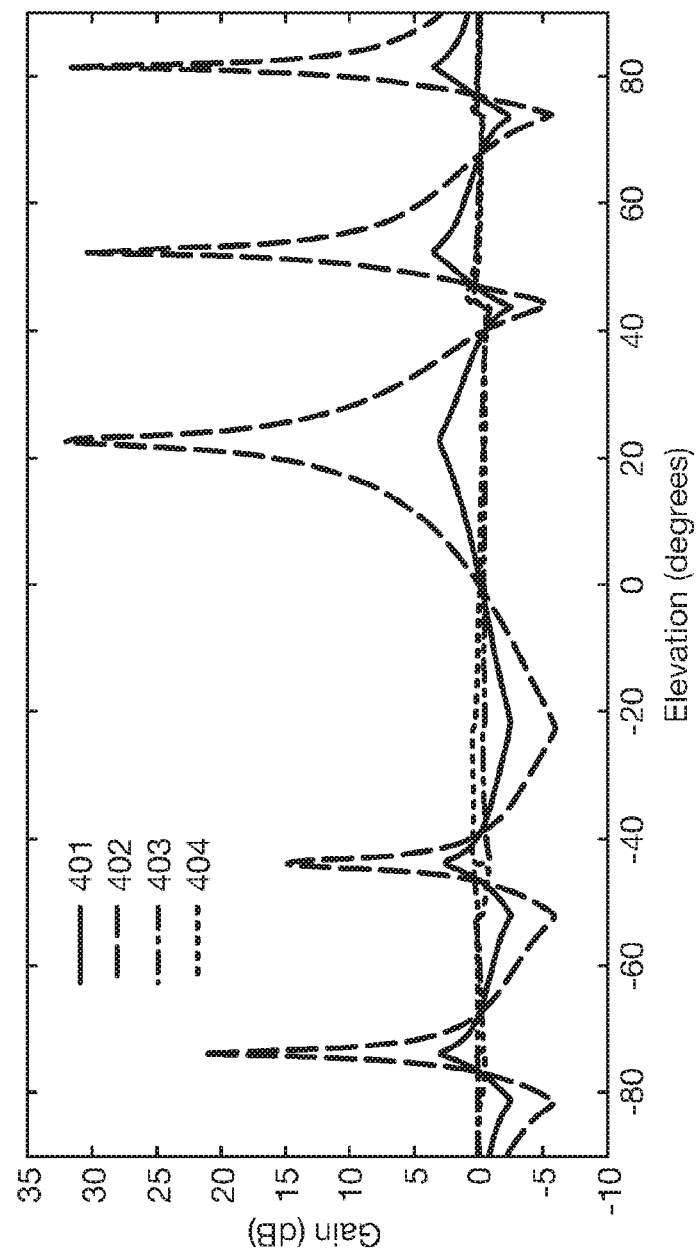

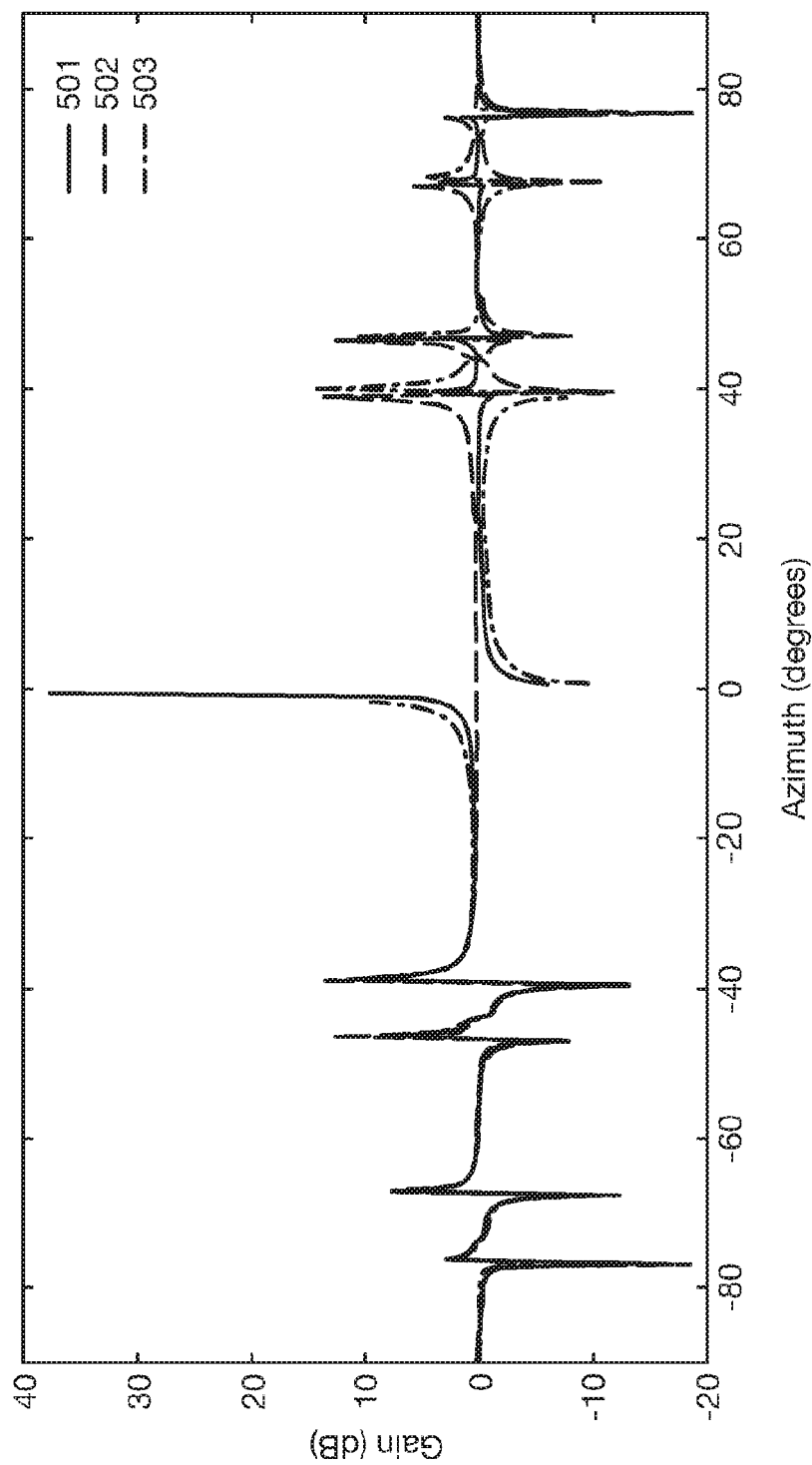

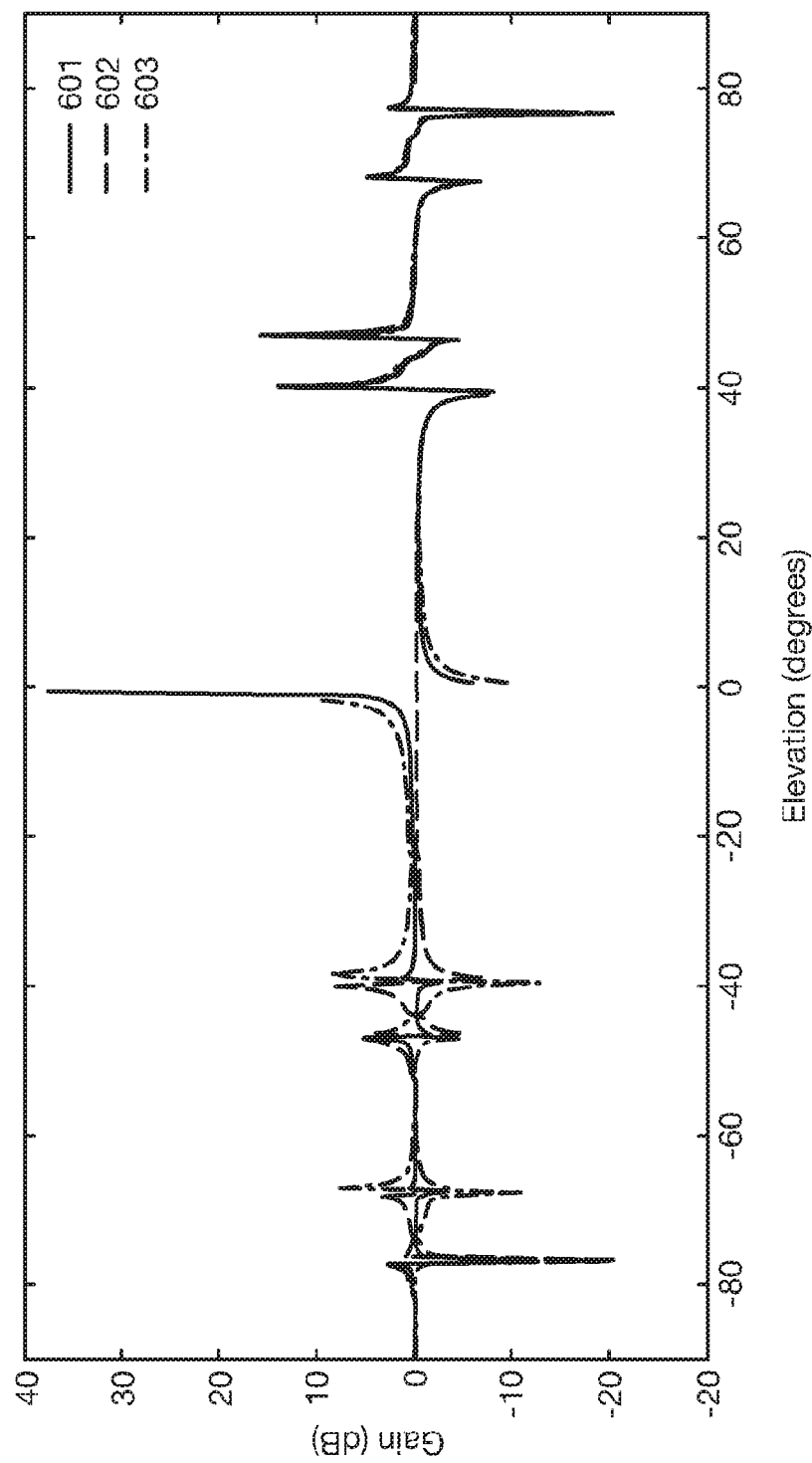

MONOPULSE RADAR APPARATUS

FIELD OF THE INVENTION

This invention relates improvements to monopulse radar apparatus. It is anticipated that the invention will find particular application in the field of airborne monopulse radar apparatus.

BACKGROUND

Monopulse radar systems are known, for example from U.S. Pat. No. 3,560,974 to Lecourtier et al. In such systems, multiple overlapping beams are emitted from an antenna in a manner such that target reflections arising from a single pulse enable the direction to the target to be deduced. Typically, such systems comprise an array of feed elements disposed around a boresight of the antenna, such that difference signals between the elements can be obtained in two coordinate planes, most normally the azimuth and elevation planes. These difference signals, together with a sum signal obtained by adding the signals from each element, enable the angle of the target off-boresight, and its range, to be calculated in a known manner. Advantages of monopulse systems over single antenna systems include the provision of more accurate azimuth and elevation position estimation, and the ability to detect jamming signals. These advantages make the monopulse radar arrangement highly desirable for applications in tracking radar.

Known monopulse radar systems typically comprise four feed elements disposed in a square symmetrical arrangement around the boresight of the antenna. Each feed element is connected to one input port of a comparator network. The comparator network is a collection of coaxial cables, stripline or waveguide together with appropriate dividers and combiners, arranged such that its output ports provide the sum, azimuth and elevation differences, and diagonal difference signals. The diagonal difference signal facilitates the detection of jamming signals. The comparator is thus a hardware device designed to manipulate the physical signals received by the feed elements to provide the sum and difference signals required for further processing to track objects using the radar.

International Patent Application, Publication No. WO2014/057234 discloses the provision of a digital means of obtaining sum and difference channels for monopulse angle of arrival measurements, thereby eliminating the need for large and heavy microwave comparators and allowing the resulting radar systems to be smaller, lighter, and cheaper to manufacture.

SUMMARY OF THE INVENTION

In accordance with a first aspect of the invention, there is provided monopulse radar apparatus comprising a digital processor and an antenna having a plurality of receive channels through which signals received by the antenna are passed to the processor; each receive channel including an analogue to digital converter; and the processor being arranged to calculate sum and difference signals from the signals received through each receive channel; wherein the processor is further arranged such that, in the event that a malfunction is detected in one of the plurality of receive channels, compensated sum and difference signals are calculated by the processor using the signals from the remaining, functioning receive channels.

Traditional hardware comparators suffer from the disadvantage that, in the event of one receive channel malfunctioning, the radar apparatus cannot provide any useful information, because there is no way in which the individual signals from the remaining, functioning receive channels can be re-constructed from the comparator outputs, which represent combinations of the individual receive channel signals. In the absence of information concerning the actual signals received at each feed element, or even of which receive channel has malfunctioned, it is not possible to estimate correct sum and difference signals needed for use in tracking algorithms. Embodiments of the present invention are able to compensate for a malfunction, without the addition of further components to independently record the individual receive channel signals.

The processor may be arranged to monitor the received signals over a predetermined number of pulses transmitted by a transmitter associated with the monopulse radar apparatus, and wherein the processor is configured such that a malfunction is detected when one of the received signals changes by an amount greater than a predetermined threshold level within the predetermined number of pulses. This enables the apparatus to automatically switch modes of calculation of the sum and difference signals immediately on detection of a malfunction, so that operation of the apparatus can be almost continuous through the occurrence of the malfunction. The predetermined threshold level can be selected depending on the application for which the apparatus is intended. In one embodiment the predetermined threshold level is 1 dB, but the predetermined threshold level may be selected to be in the range between 0.5 dB and 5 dB. The predetermined number of pulses can also be selected depending on the application for which the apparatus is intended. In one embodiment the predetermined number of pulses is 3, but the predetermined number of pulses may be selected to be in the range between 2 and 15.

In one embodiment described in further detail below each of the plurality of receive channels comprises an antenna feed element, the feed elements being disposed symmetrically around the boresight of the antenna. For example, there may be four receive channels. In one particular example, the four feed elements associated with the receive channels may be disposed in a square configuration, with the antenna boresight passing through the centre of the square.

The processor may be configured such that, in the event that a malfunction is detected in one of the plurality of receive channels, the sum signal is calculated using the signals from the two feed elements associated with functioning receive channels and adjacent the malfunctioning feed element. Surprisingly, it has been found that using the signal from only two of the remaining receive channels provides a better representation of the sum signal than a sum of the signal from more of the remaining antenna elements. The sum signal may be calculated as a scaled sum of the signals received at the two functioning feed elements associated with functioning receive channels and adjacent the malfunctioning feed element. The scaled sum signal can be calculated to be more consistent with the sum signal obtained prior to a malfunction.

The computer processing means may be configured such that, in the event that a malfunction is detected in one of the plurality of receive channels, the difference signals are calculated using the signals from the two feed elements associated with the functioning receive channels and adjacent one another in the direction of the difference being taken. It has been found that these calculations provide a better representation of the difference signals than other possible methods of combining the signals from the remaining, functioning antenna elements. The difference signals may be calculated as scaled differences of the signals received at the two feed elements associated with the functioning receive channels and adjacent one another in the direction of the difference being taken. As with the sum signal, the scaled difference signals can be calculated to be more consistent with the difference signals obtained prior to a malfunction.

The invention extends to a missile having a tracking radar, the tracking radar comprising a monopulse radar apparatus as described above. The enhanced robustness achieved by monopulse radars using the present invention is expected to find particular application in seeker devices used in missiles.

BRIEF DESCRIPTION OF THE DRAWINGS

There follows, by way of example only, a detailed description of specific embodiments of the invention with reference to the accompanying drawings in which:

FIGS. 3 and 4 are graphs illustrating a simulated comparison between scaled sum signals calculated in accordance with an embodiment of the invention; and FIGS. 5 and 6 are graphs illustrating a simulated comparison between scaled difference signals calculated in accordance with an embodiment of the invention.

DETAILED DESCRIPTION

Figure 1:
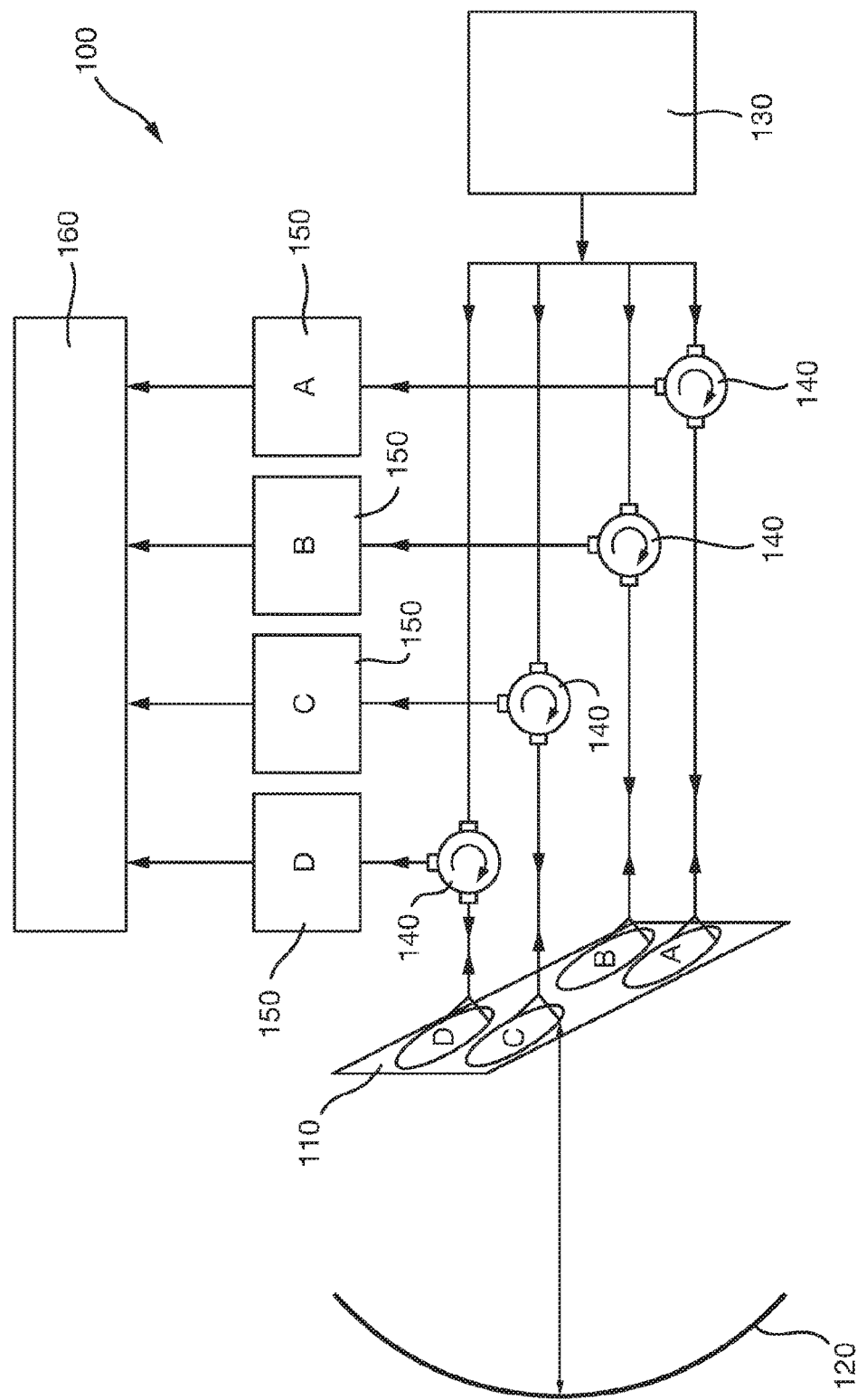
FIG. 1 is a schematic illustration of a monopulse radar apparatus in accordance with a first embodiment of the invention.

FIG. 1 is a schematic illustration of a monopulse radar apparatus 100 in accordance with a first embodiment of the invention. Apparatus 100 comprises a feed element cluster 110, having four feed elements A, B, C, and D disposed in the focal plane of a parabolic reflector 120. The feed elements act both to transmit a radio frequency signal, which may have a power of order several megawatts, and to receive signals reflected from potential targets. A single transmitter 130 generates the waveform for transmission. The waveform is split into separate signals for transmission from each of the feed elements A, B, C, D. The split is performed such that, as far as practicable, each of the elements transmits the same waveform. Each of the signals for transmission is passed, via waveguide, to a circulator 140, and then, again through waveguide, to its respective feed element for ongoing transmission out of the system and towards a target for observation.

Returned signals, comprising reflections of the transmitted signals from the target or other objects, are focussed onto the feed element cluster 110 by the reflector 120. Each feed element outputs a signal through waveguide to that feed elements associated circulator 140. The circulator is arranged such that, whilst signals from the transmitter are passed to the feed elements, received signals, entering a different input of the circulator, are passed to a respective feed element receiver 150. Each feed element receiver 150 includes an analogue-to-digital converter, such that a digital output is provided to processor 160. Processor 160 measures the magnitude and phase of the received signal, and combines each of the four received signals as described below. In the present embodiment a general purpose computer is used; although it will be appreciated that, in other embodiments, it may be preferable to implement a digital processor specifically for the purposes of manipulating the received signals in digital form. It will therefore be seen that the apparatus 100 comprises four receive channels, each having a feed element (A, B, C, or D) for the reception of RF signals, and an analogue to digital converter 150 communicating with the feed element via co-axial cable. The output of each receive channel is passed directly to the processor 160.

Figure 2:
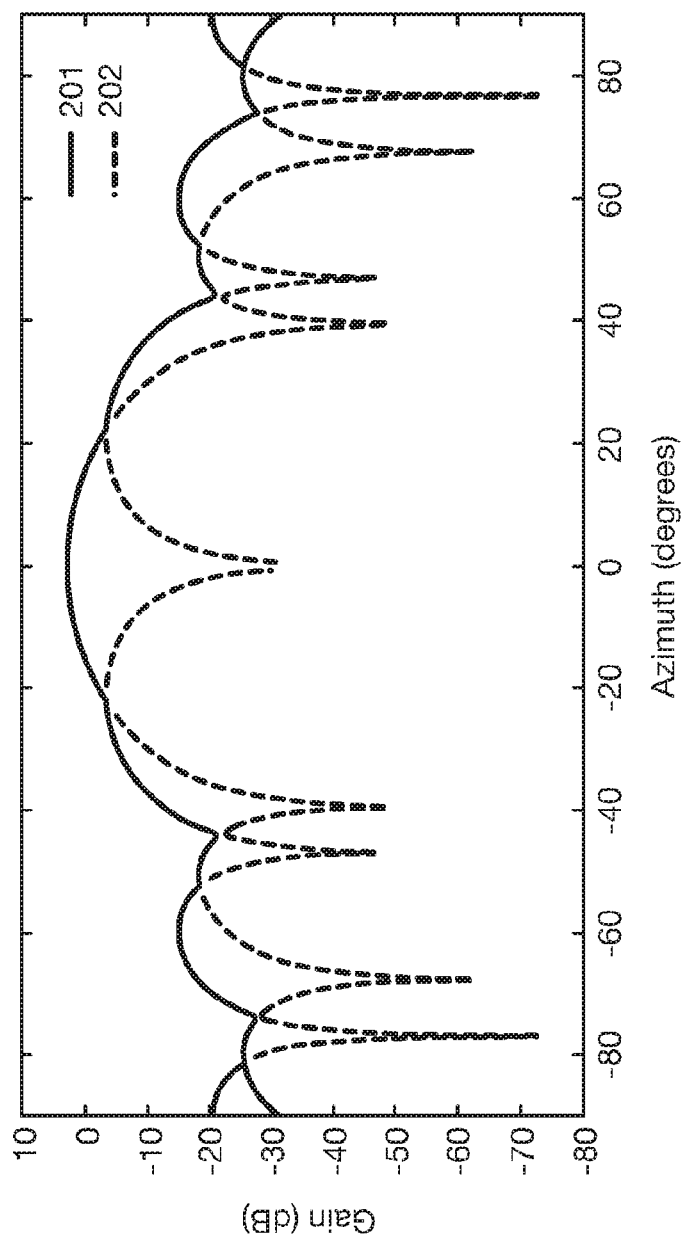
FIG. 2 is a graph illustrating sum and difference signals simulated for the case of the monopulse radar apparatus of FIG. 1 when fully functioning.

The processor 160 is programmed to perform the function of a hardware comparator, so as to produce a sum signal ($\Sigma$), azimuth and elevation difference signals ($\Delta AZ$ and $\Delta EL$ respectively) and a diagonal difference Q. In reality, hardware comparators suffer from losses, which are eliminated through the direct connection of the feed elements to a receiver. The computer is programmed to calculate these signals in accordance with the following relationships:

$$\Sigma = \frac{(A+B+C+D)}{2} \quad (1)$$

$$\Delta AZ = \frac{(A+C)-(B+D)}{2} \quad (2)$$

$$\Delta EL = \frac{(A+B)-(C+D)}{2} \quad (3)$$

$$Q = \frac{(A+D)-(B+C)}{2} \quad (4)$$

where the division by 2 is included in order to ensure that the calculated signals respect conservation of energy. The quantities $\Sigma$, $\Delta AZ$, $\Delta EL$, and Q can then be used in further signal analysis, for example to provide tracking functionality for the monopulse radar apparatus. FIG. 2 illustrates example simulated patterns, in azimuth cut, for $\Sigma AZ$ and $\Delta AZ$. The sum pattern is shown in full line, reference 201 and the difference pattern is shown in dashed line, reference 202.

In contrast to monopulse radars using traditional hardware comparators, in the event that one of the receive channels in apparatus 100 suffers from a malfunction, approximations to the sum and difference signals can still be calculated and used in further signal analysis. The malfunction may be a partial or complete failure of the receive channel. A malfunction may be caused, for example, by a blockage in the feed element, by damage to the feed element, or by damage to another part of the receive channel, such as the connecting co-axial cable.

A malfunction may be detected by monitoring the signals from the receive channels, either individually or in combination. For example, a sudden drop in the signal received from one feed element may be indicative of a malfunction in that feed element. Similarly, sudden changes in the balance between the different channels may also be indicative of malfunction in one of the feed elements. Such sudden changes can be readily detected by the processor 160, for example by setting threshold change level such that, should the signal from one feed element change by more than a threshold level within a predetermined number of consecutive transmit pulses, or should one of the difference signals change by more than a threshold level within a predetermined number of consecutive transmit pulses, further signal processing is accomplished using the scaled sum and difference signals described below, rather than the processing based on signals from all four of the feed elements in the feed element cluster.

Simulations can be performed to identify the dependence of the difference signals on a relative loss in the signal from one of the elements in order to assist in determining the threshold level for a particular application. The predetermined number of consecutive transmit pulses can be determined in light of the particular application for which the apparatus is intended. Where it is desired to minimise the number of false malfunction detections, a larger number of pulses will be selected; whilst, where it is more important to ensure continuous functioning of the apparatus, a smaller number of pulses may be selected. For example, the predetermined number may be between 2 and 15 consecutive pulses. In the present embodiment, the threshold level is selected to be an increase in the RMS difference signal of greater than 1 dB, and the predetermined number of pulses is selected to be 3 consecutive transmit pulses.

An example of how the sum and difference signals $\Sigma$, $\Delta AZ$, and $\Delta EL$ can be calculated in the event of failure of one of the receive channel is now provided. Whilst a functioning system would also provide the Q difference signal, the apparatus can perform satisfactorily without needing the Q difference, which is unnecessary for most applications of monopulse radars.

For the purposes of the example it will again be assumed that feed element A has malfunctioned in some way. The signal from feed element A is therefore not useable in subsequent calculations of the sum and difference signals. Once monitoring reveals the malfunction in feed element A, the processor automatically switches to calculate the sum and difference signals using scaled versions of the calculations in equations (1) to (4) above, which do not use the signal from the feed element A. The scaled sum signal $\Sigma_s$ is calculated as:

$$\Sigma_s = B + C \qquad (5)$$

It has been found through simulation work, confirmed with experimentation, that the scaling of the signals from the feed elements B and C, and disregarding the information available from the signal received at feed element D, results in a better sum pattern than would be obtained by including the information from feed element D. It is thought that using the feed elements on a functioning diagonal of the feed element cluster is less likely to produce a sum pattern that is affected by potential imbalance between the different feed elements. This is illustrated in FIGS. 3 and 4, which show the difference between the $\Sigma$ signal pattern as calculated from each of the elements A, B, C, D (as per equation (1) above, and as illustrated in FIG. 2) with different possible sum permutations of the feed elements. These permutations are: BCD, CD, BD, and BC. FIG. 3 illustrates these permutations for the azimuth cut through the $\Sigma$ pattern, whilst FIG. 4 illustrates these permutations for the elevation cut through the $\Sigma$ pattern. In FIG. 3, the BCD permutation is represented by line 301; the CD permutation by line 302; the BD permutation by line 303; and the BC permutation by line 304. Like reference numerals, but incremented by 100 but incremented by 100, are used to refer to the same permutations in FIG. 4.

In both cuts, it can be seen that the scaled signal defined by equation (5) is clearly the best approximation to the actual signal obtained through equation (1) for the case without a failed feed element. This is evident from the graphs in that the lines having a small dash style—lines 304 and 404 in FIGS. 3 and 4 respectively—demonstrate only a comparatively small difference from 0 dB throughout the ranges of angular position. In fact, the root mean square difference between $\Sigma_s$ as defined by (5) and $\Sigma$ as defined by (1) is 0.11 dB for both the azimuth and elevation cuts illustrated in FIGS. 3 and 4. This difference is equivalent to a feed element drop in gain of less than 0.5 dB, but with no drop in peak gain.

The scaled difference signals, in the event of element A malfunctioning, are calculated according to the following relationships:

$$\Delta AZ_s = D - C \qquad (6)$$

$$\Delta EL_s = B - D \qquad (7)$$

As is the case with the scaled sum signals, the quantities $\Delta AZ_s$ and $\Delta EL_s$ can also be calculated using a variety of permutations of combinations of the individual signals from the remaining, functioning feed elements. These possible difference patterns, including those produced by relationships (6) and (7), have been simulated. These permutations are, for $\Delta AZ_s$:

$$\Delta AZ_s = \frac{(B + D)}{2} - C \qquad (8)$$

$$\Delta AZ_s = B - C \qquad (9)$$

$$\Delta AZ_s = D - C \qquad (10)$$

Analogous relationships can be used for calculation of $\Delta EL_s$. The difference between the pattern obtained with all elements functioning, and those obtained using the above relationships for $\Delta AZ_s$, is illustrated in FIG. 5. In FIG. 5, line 501 represents the BCD permutation; line 502 represents the CD permutation; and line 503 represents the BC permutation. The difference between the pattern obtained with all elements functioning, and those obtained using the analogous relationships for $\Delta EL$, are shown in FIG. 6. In FIG. 6, line 601 represents the BCD permutation; line 602 represents the BD permutation; and line 603 represents the BC permutation. As is clear from FIG. 5, the different combinations of feed elements can squint the beam or cause a change in the gain. The combination represented by relationship (6) provides the best fit to the difference signal obtained when all four feed elements are functioning normally. FIG. 6 shows the simulations for $\Delta EL_s$. Again it is clear that the different combinations can squint the beam or cause a change in gain, but that the best result is obtained using relationship (7).

For both of the difference signals, the RMS difference between the difference signal and the scaled difference signal obtained from relationship (6) or (7), as may be appropriate, is 0.24 dB. Whilst this fit is not as good as that for the sum signal, it is clear that it provides a useable approximation to the actual difference signals to enable continued operation of the antenna despite the presence of a failed element. It is currently thought that the relationships (6) and (7) provide the best fit because they allow the creation of the difference cuts without using the section of the monopulse horn that is damaged. Thus, to create a difference signal from a four port monopulse feed with one failed element, it is thought that the signal from two of the remaining feed elements should be used, discarding the signal from the failed feed element and the feed element adjacent to the failed feed element in terms of the cut that is being taken.

Whilst a specific embodiment of the invention have been described in the above, it is to be noted that variations and modifications to the embodiment are possible without departing from the scope of the present invention which is defined in the accompanying claims. By way of example, although it has been described to use waveguide for passing the signals through the apparatus, it will of course be appreciated that it would be possible to use co-axial cable or stripline in certain embodiments, particularly where lower power signals are used. It will also be appreciated that, whilst in the above it has been described to use scaled versions of the relationships for the sum and difference patterns in the event of one feed element failing, it may in some applications be desired to calculate the an unscaled pattern.

It will also be noted, for example, that whilst the terminology of azimuth and elevation difference has been used in the above, as is appropriate to airborne monopulse radar apparatus has been used in the above, the invention is also applicable to ground based radar systems, for which the terms azimuth and elevation will be construed appropriately as elevation and traverse. Moreover, those skilled in the art will appreciate that monopulse radar apparatus is often used, in conjunction with beam steering means (for example, mechanical beam steering means, or other means well-known to those skilled in the art), in tracking applications, and the above-described embodiments will also therefore find application in tracking radars. Where embodiments of the invention are to be used in aerospace applications, such as, for example, on a missile or aircraft, it is currently considered that a tailored digital processing unit should be used to implement the functionality of the comparator, or that an existing processing unit on-board the missile or aircraft should be adapted to process the received signals as described above.

The invention claimed is:

1. A monopulse radar apparatus comprising:
    a digital processor;
    an antenna;
    a plurality of receive channels configured to pass signals received by the antenna to the processor;
    a plurality of analogue to digital converters, one of the plurality of analogue to digital converters being arranged in a corresponding one of the plurality of receive channels;
    wherein the processor is configured to:
        measure magnitude and phase of the signals received through each receive channel and to calculate sum and difference signals from the signals received through each receive channel,
        monitor the signals received through each receive channel to detect a malfunction in one of the plurality of receive channels,
        in response to detecting a malfunction in one of the plurality of receive channels, calculate further sum and difference signals using the signals from the functioning receive channels and not using signals from the detected malfunctioning receive channel, and
        tracking a target based on the calculated further sum and difference signals.

2. Apparatus as claimed in claim 1, wherein the processor is arranged to monitor the received signals over a predetermined number of pulses transmitted by a transmitter associated with the monopulse radar apparatus, and wherein the processor is configured such that a malfunction is detected when one of the received signals changes by an amount greater than a predetermined threshold level within the predetermined number of pulses.

3. Apparatus as claimed in claim 1, wherein each of the plurality of receive channels comprises an antenna feed element and a circulator, the feed elements being disposed symmetrically around the boresight of the antenna, each circulator being configured to pass the signals from the feed elements to the respective analogue to digital converter of each channel.

4. Apparatus as claimed in claim 3, wherein the antenna comprises only four receive channels.

5. Apparatus as claimed in claim 4, wherein the sum signal is calculated using the signals only from the two feed elements associated with functioning receive channels and adjacent the malfunctioning feed element.

6. Apparatus as claimed in claim 5, wherein the sum signal is calculated as a scaled sum of the signals received at only the two functioning feed elements associated with functioning receive channels and adjacent the malfunctioning feed element.

7. Apparatus as claimed in claim 4, wherein the difference signals are calculated using the signals from only the two feed elements associated with the functioning receive channels and adjacent one another in the direction of the difference being taken.

8. Apparatus as claimed in claim 7, wherein the difference signals are calculated as scaled differences of the signals received at only the two feed elements associated with the functioning receive channels and adjacent one another in the direction of the difference being taken.

9. A missile having a tracking radar, the tracking radar comprising a monopulse radar apparatus as claimed in claim 1.

* * * * *